United States Patent
Guo et al.

(10) Patent No.: US 9,491,597 B2
(45) Date of Patent: *Nov. 8, 2016

(54) SYSTEMS AND METHODS FOR COMMUNICATION NOTIFICATION AND HANDLING

(71) Applicant: Vonage Network, LLC, Holmdel, NJ (US)

(72) Inventors: Zhiyu Guo, East Brunswick, NJ (US); Guy Fighel, Red Bank, NJ (US)

(73) Assignee: Vonage Business Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,241

(22) Filed: Mar. 30, 2015

(65) Prior Publication Data

US 2015/0208211 A1 Jul. 23, 2015

Related U.S. Application Data

(63) Continuation of application No. 13/338,186, filed on Dec. 27, 2011, now Pat. No. 8,996,069.

(51) Int. Cl.
| | |
|---|---|
| *H04M 1/00* | (2006.01) |
| *H04W 4/12* | (2009.01) |
| *H04M 1/57* | (2006.01) |
| *H04L 29/08* | (2006.01) |
| *H04M 1/725* | (2006.01) |
| *H04M 3/42* | (2006.01) |

(52) U.S. Cl.
CPC ............... *H04W 4/12* (2013.01); *H04L 67/26* (2013.01); *H04M 1/57* (2013.01); *H04M 1/7255* (2013.01); *H04M 1/72552* (2013.01); *H04M 3/42059* (2013.01); *H04M 2250/60* (2013.01)

(58) Field of Classification Search
CPC ....................................................... H04W 4/12
USPC ......................................................... 455/566
See application file for complete search history.

(56) References Cited

U.S. PATENT DOCUMENTS

| | | | |
|---|---|---|---|
| 7,200,390 B1 | 4/2007 | Henager et al. | |
| 7,493,381 B2 | 2/2009 | Garg | |
| 7,548,932 B2 | 6/2009 | Horvitz et al. | |
| 8,135,392 B2 | 3/2012 | Marcellino et al. | |
| 8,509,742 B2 | 8/2013 | Gopinath et al. | |
| 8,996,069 B2* | 3/2015 | Guo ........................ | H04M 1/57 455/412.1 |
| 2006/0217126 A1 | 9/2006 | Sohm et al. | |

(Continued)

OTHER PUBLICATIONS

International Search Report issued in PCT/US2012/071141 on Jun. 7, 2013.

(Continued)

*Primary Examiner* — Sanh Phu
(74) *Attorney, Agent, or Firm* — Nixon & Vanderhye, P.C.

(57) ABSTRACT

An Internet protocol (IP) telephony system provides telephony services to a mobile telephony device via data packet communications that traverse a data network. If the IP telephony system has received calls that were missed by the user of the mobile telephony device, or if the IP telephony system has received communications that have not yet been reviewed by the user of the mobile telephony device, information about those missed calls and unreviewed messages is delivered to the mobile telephony device so that the user can be alerted to their existence. The information may be delivered to the mobile telephony device in a push notification.

20 Claims, 5 Drawing Sheets

(56) References Cited

U.S. PATENT DOCUMENTS

| | | |
|---|---|---|
| 2006/0222152 A1 | 10/2006 | Elias et al. |
| 2009/0017802 A1 | 1/2009 | Zhang et al. |
| 2009/0141875 A1 | 6/2009 | Demmitt et al. |
| 2009/0305732 A1 | 12/2009 | Marcellino et al. |
| 2010/0005421 A1 | 1/2010 | Yoshioka |
| 2011/0002268 A1 | 1/2011 | Dwyer et al. |
| 2011/0075828 A1 | 3/2011 | Okita et al. |
| 2011/0076989 A1 | 3/2011 | Lynch |
| 2011/0231478 A1 | 9/2011 | Wheeler et al. |
| 2011/0289172 A1 | 11/2011 | Marcellino |
| 2012/0078726 A1 | 3/2012 | Black et al. |
| 2012/0157098 A1 | 6/2012 | Singh et al. |

OTHER PUBLICATIONS

Written Opinion issued in PCT/US2012/071141 on Jun. 7, 2013.
Office Action dated Apr. 26, 2013, in parent application, U.S. Appl. No. 13/338,186.
Office Action dated Oct. 28, 2013, in parent application, U.S. Appl. No. 13/338,186.
Office Action dated Jul. 28, 2014, in parent application, U.S. Appl. No. 13/338,186.
Notice of Allowance dated Nov. 12, 2014, in parent application, U.S. Appl. No. 13/338,186.

\* cited by examiner

SYSTEMS AND METHODS FOR COMMUNICATION NOTIFICATION AND HANDLING

CROSS-REFERENCE TO RELATED APPLICATIONS

This application is a continuation of U.S. patent application Ser. No. 13/338,186 filed Dec. 27, 2011.

BACKGROUND OF THE INVENTION

The invention is related to Internet protocol (IP) telephony systems that provide telephony services to mobile telephony devices. The mobile telephony devices communicate with the IP telephony systems via data packet communications that are transmitted over a wireless data connection.

A mobile telephony device runs a software application provided by an IP telephony system. The software application enables the mobile telephony device to place or receive voice over Internet protocol (VOIP) telephone calls through the IP telephony system. The software application can also enable the mobile telephony device to send and receive other forms of telephony communications, such as SMS and MMS messages, video calls, and other similar communications. The software application may also enable the mobile telephony device to obtain and play voicemail messages that have been recorded for the user of the mobile telephony device.

When an application provided by an IP telephony system is loaded and run on a mobile telephony device, the application contacts and registers with the IP telephony system via a wireless data connection provided by the mobile telephony device. So long as the application is actively running on the mobile telephony device, a wireless communication path may be kept open between the application on the mobile telephony device and the IP telephony system. However, keeping such a communication path open and available may require that a small amount of data traffic be sent between the mobile telephony device and the IP telephony system on a periodic basis. These periodic messages are called "keep alive" messages.

Provided the communication path remains open and available, any time that an incoming call for the mobile telephony device is received by the IP telephony system, the call is connected to the mobile telephony device via that open path. Likewise, if an incoming SMS or MMS message directed to the mobile telephony device is received by the IP telephony system, the communication is delivered to the mobile telephony device via that path. Also, if the user of the mobile telephony device wishes to place an outgoing call, or send an outgoing SMS or MMS message, the communication is established or sent via the open path.

Because most mobile telephony devices run on battery power, it is common for a mobile telephony device, or the application, to cease sending "keep-alive" messages, and thus terminate the open path, if no activity occurs for an extended period of time. Doing so reduces power consumption, and extends battery life. Also, a user may not open and run such the software application used to communicate with the IP telephony system until the user wishes to place an outgoing call or send an outgoing message. Further, if a user has ended a call, or sent a communication, the user may choose to deliberately terminate such an application. If the application is not running on the mobile telephony device, or if the wireless communication path is not open and available, it is difficult and sometimes impossible for the IP telephony system to readily communicate with the mobile telephony device for the purpose of terminating a call to the mobile telephony device, or delivering a message to the mobile telephony device. Moreover, when the IP telephony system is not capable of communicating with the application on the mobile telephony device, the IP telephony system is unable to even inform the user that the user has missed a call, or that communications and/or voicemail messages are waiting for the user.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

Figure 1:
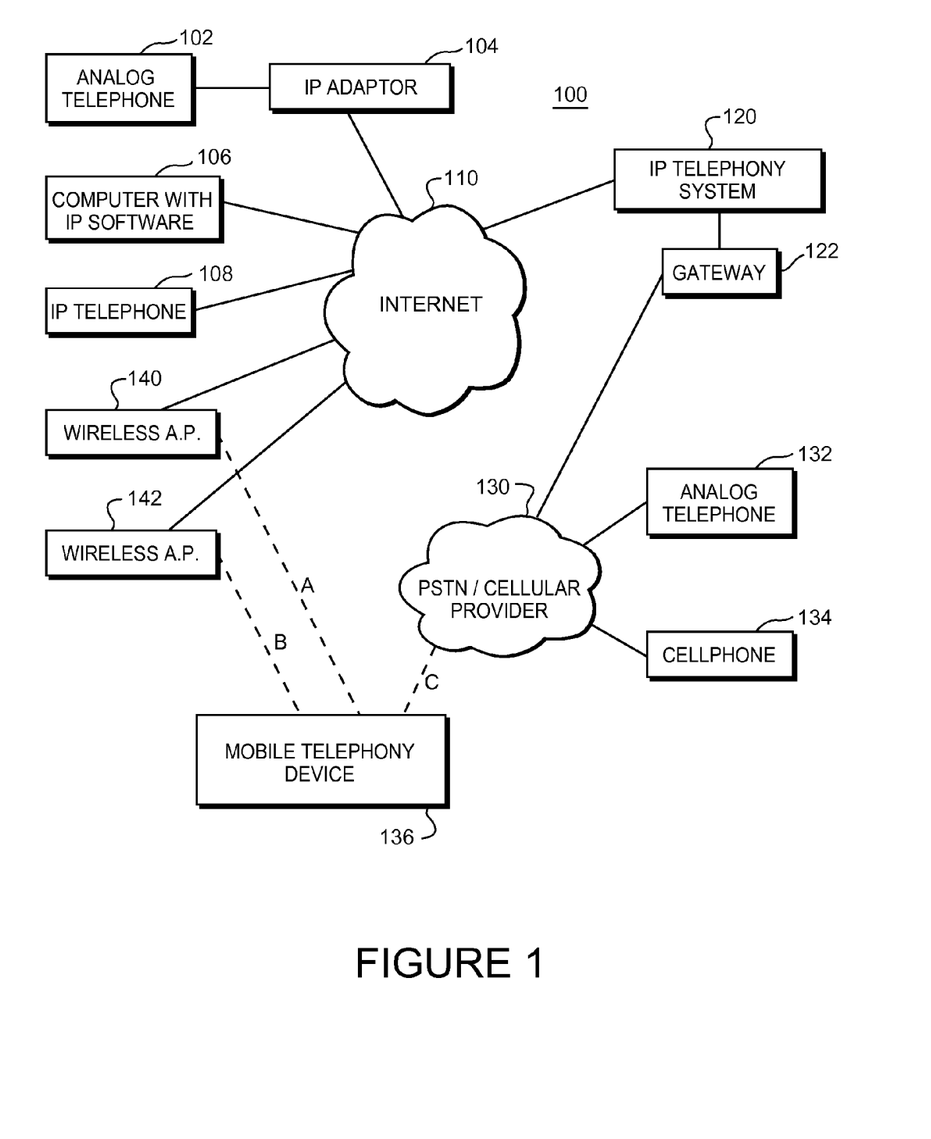
FIG. 1 is a diagram of a communications environment including various elements which are associated with an Internet protocol (IP) telephony system operating in accordance with the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™ Such a device may act as a mobile telephony device once it is configured with appropriate application software.

FIG. 1 illustrates that a mobile telephony device 136 is capable of establishing a first wireless data connection A with a first wireless access point 140, such as a WiFi or WiMax router. The first wireless access point 140 is coupled to the Internet 110. Thus, the mobile telephony device 136 can establish a VOIP telephone call with the IP telephony system 120 via a path through the Internet 110 and the first wireless access point 140.

FIG. 1 also illustrates that the mobile telephony device 136 can establish a second wireless data connection B with a second wireless access point 142 that is also coupled to the Internet 110. Further, the mobile telephony device 136 can establish a third wireless data connection C via a data channel provided by a cellular service provider 130 using its cellular telephone capabilities. The mobile telephony device 136 could also establish a VOIP telephone call with the IP telephony system 120 via the second wireless connection B or the third wireless connection C.

Although not illustrated in FIG. 1, the mobile telephony device 136 may be capable of establishing a wireless data connection to a data network, such as the Internet 110, via alternate means. For example, the mobile computing device 136 might link to some other type of wireless interface using an alternate communication protocol, such as the WiMax standard.

Figure 2:
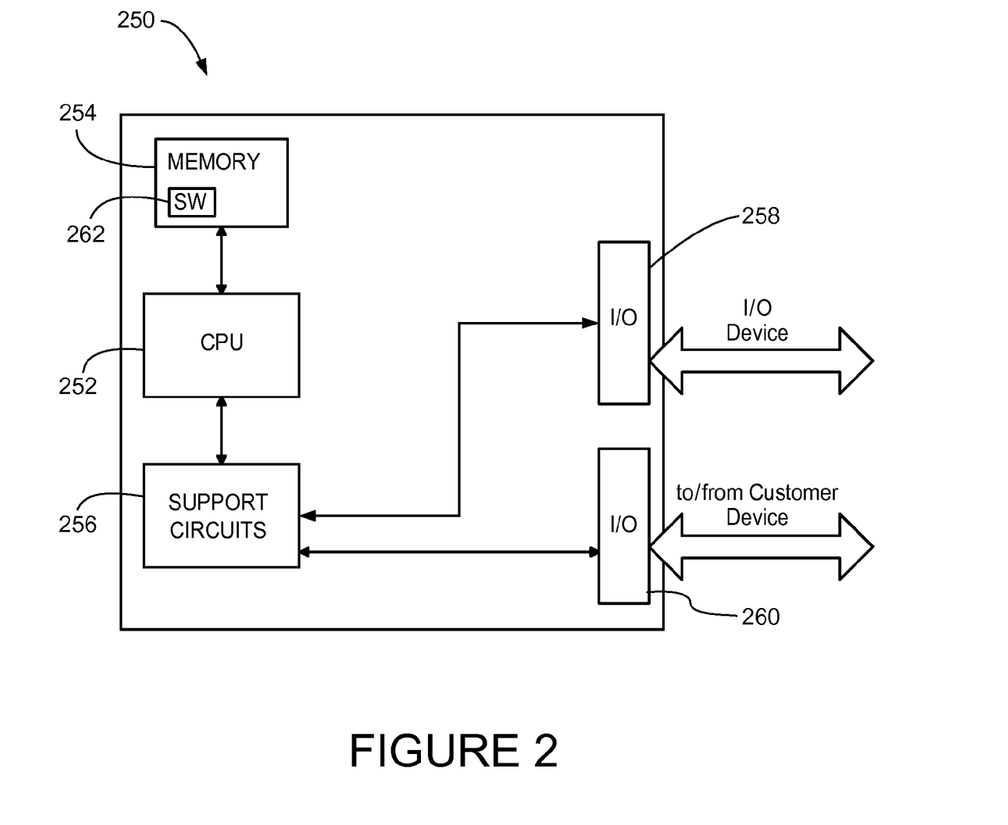
FIG. 2 is a block diagram of various elements of a processor that forms part of an IP telephony system operating in accordance with the invention.

FIG. 2 illustrates elements of a computer processor 250 that can be used as part of the system operated by the IP telephony system 120 to accomplish various functions. The IP telephony system 120 could utilize multiple processors 250 located at various locations, along with their operating components and programming, each carrying out a specific or dedicated portion of the functions performed by the IP telephony system 120.

The processor 250 shown in FIG. 2 may be one of any form of a general purpose computer processor used in operating an IP based communication system. The processor 250 comprises a central processing unit (CPU) 252, a memory 254, and support circuits 256 for the CPU 252. The processor 250 also includes provisions 258/260 for connecting the processor 250 to customer equipment via one or more access points, such as the Internet 110, the gateway 122 and a data channel provided by a cellular service provider 130, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

Another form of processor 250 that assists in execution and is otherwise part of the subject invention is found within a mobile telephony device 136. Such devices are sufficiently advanced beyond early generation cellular telephones that they contain processors capable of running operating systems developed by device manufactures, as well as third party applications that are downloaded and installed by users to performing a myriad of communications and non-communications oriented tasks.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120 or the mobile telephony device 136. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

As explained above in the background section, a mobile telephony device 136 can run an application to communicate with an IP telephony system 120 for the purpose of initiating and receiving telephone calls and for the purpose of sending or receiving other forms of communications. Communications between the IP telephony system 120 and the mobile telephony device 136 take the form of data packet communications that pass over a wireless data connection to the mobile telephony device 136.

As also explained above, if the application is not running on the mobile telephony device 136, or if a wireless data connection between the IP telephony system 120 and the application on the mobile telephony device 136 is not open and available, the IP telephony system 120 may find it impossible to terminate incoming calls to the mobile telephony device 136, or to deliver communications and voicemail recordings to the mobile telephony device 136. Further, the IP telephony system 120 cannot even inform the user of the mobile telephony device 136 that he has missed calls, or that unread/unheard communications are waiting to be delivered to the mobile telephony device 136.

Systems and methods embodying the invention provide a mechanism for informing a user when he has missed an incoming call or when unread communications and voicemail recordings are waiting to be delivered to the mobile telephony device. This mechanism makes use of push notifications that are delivered to the user's mobile telephony device 136.

Many mobile telephony devices 136 are configured to receive push notifications, even when they are in an idle state or power saving mode. Also, mobile telephony devices 136 are configured such that no particular software application needs to be running on the mobile telephony device 136 to allow the mobile telephony device 136 to accept and display a push notification. Provided a push notification is sent from a proper originating entity, and includes proper identification codes, a mobile telephony device 136 will accept the push notification and display it to the user.

Push notifications are delivered to a mobile telephony device 136 by a push notification service. The push notification service may be associated with the maker of the mobile telephony device, or with a service provider that provides cellular service to the mobile telephony device 136.

When a push notification is received by a mobile telephony device 136, the mobile telephony device 136 displays a text-based message that is included in the push notification. A push notification may also cause the mobile telephony device 136 to display two selectable buttons. Selecting one of the buttons causes the mobile telephony device 136 to ignore the push notification. Selecting the other button may cause an action to be performed by the mobile telephony device 136.

Third party software developers that have provided a software application that is loaded onto a mobile telephony device 136 can configure their software applications to register with a push notification service. Once a software application on a mobile telephony device 136 has registered with the push notification service, the producer of the software application can cause the push notification service to send push notifications to the mobile telephony device 136.

A third party that has provided a software application that is loaded onto a mobile telephony device 136 can cause the application to be loaded and run on the mobile telephony device 136 by sending a push notification to the mobile telephony device 136. As noted above, a push notification can cause the mobile telephony device 136 to display two user selectable buttons, one of which causes the mobile telephony device 136 to take a certain action. When the user of the mobile telephony device 136 selects such a button, which is displayed in response to receipt of a push notification sent from the third party, the software application provided by that third party is loaded and run on the mobile telephony device 136. Further, information contained in the received push notification may be provided to the application, and the application may use that information to take certain actions.

Figure 3:
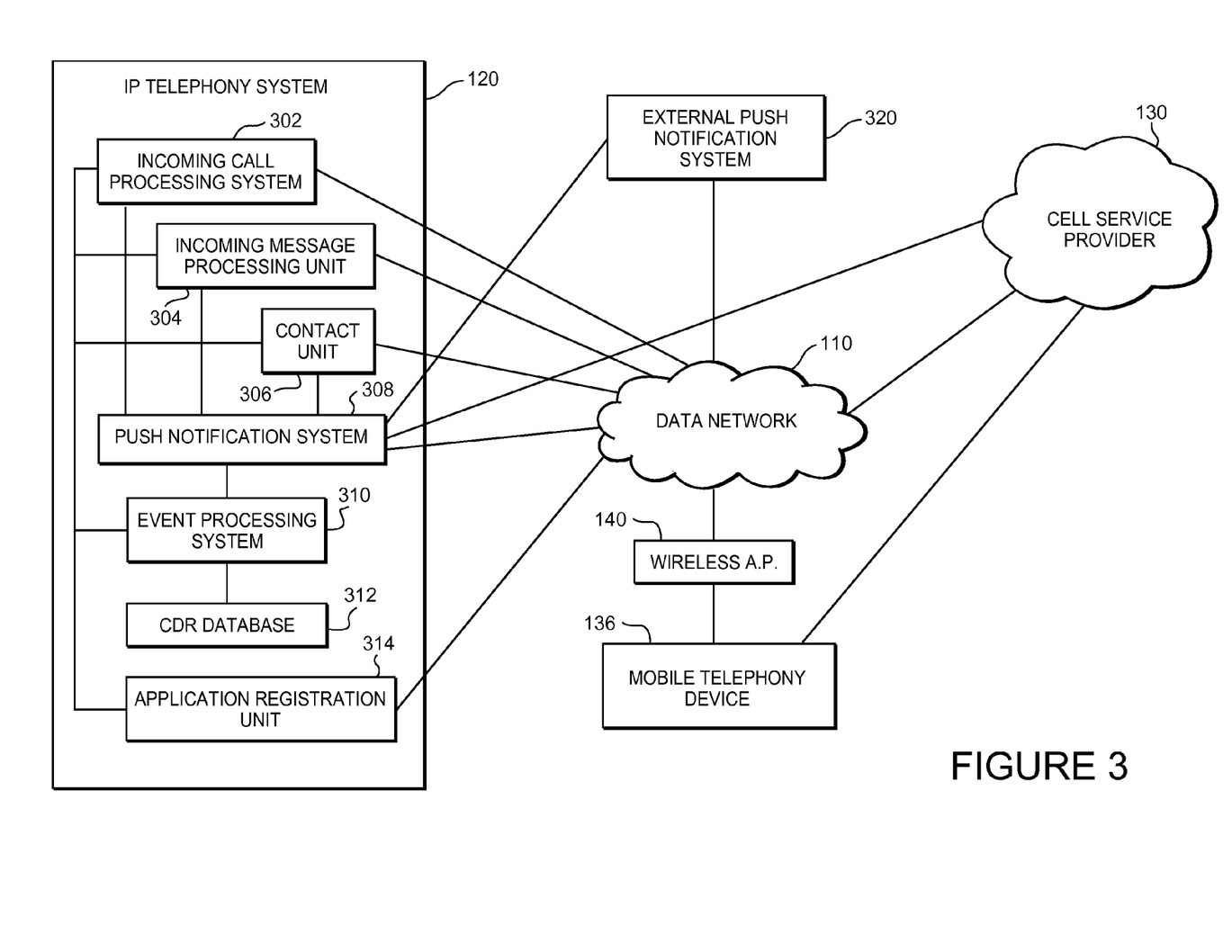
FIG. 3 is a block diagram illustrating how various elements of an IP telephony system embodying the invention interact with a mobile telephony device.

FIG. 3 illustrates a communications environment that is capable of performing methods embodying the invention. In this communications environment, an IP telephony system 120 provides communications services to a mobile telephony device 136 via data packet communications that pass over a data network 110, such as the Internet. In some embodiments, the mobile telephony device 136 accesses the data network 110 via a wireless access point 140. In alternate embodiments, the mobile telephony device 136 accesses the data network 110 via a data channel provided by a cellular service provider 130.

In some embodiments, a push notification is delivered to the mobile telephony device 136 by a push notification service 308 that is part of the IP telephony system 120. The push notification may be delivered via a path that includes the data network 110 and the wireless access point 140. Alternatively, the push notification may be delivered to the mobile telephony device 136 via a path that includes the cellular service provider 130.

In other embodiments, the push notification may be delivered to the mobile telephony device 136 from an external push notification service 320 that is operated by a third party. In that instance, the internal push notification service 308 would send a communication to the external push notification service 320, either directly or via the data network 110, requesting that a specific push notification be delivered to the mobile telephony device 136. The external push notification service 320 then causes an appropriate push notification to be delivered to the mobile telephony device 136 via the data network 110 and the wireless access point 140, or via the cellular service provider 130. An example of an external push notification service is the Apple Push Notification Service that delivers push notifications to Apple iPhones™ and other Apple devices.

Push notifications may be sent to the mobile telephony device 136 under a variety of different circumstances for a variety of different purposes. In each case however, the push notification is sent only if the IP telephony system 120 finds that it is unable to communicate with the application on the mobile telephony device 136. As noted above, this could occur if the application is not loaded and running on the mobile telephony device 136, or where a wireless data path between the IP telephony system 120 and the application on the mobile telephony device 136 is not active and available.

In one circumstance, an incoming call processing system 302 of the IP telephony system 120 receives an incoming call that is directed to the mobile telephony device 136, and the incoming call processing system 302 finds it is unable to communicate with the application on the mobile telephony device 136 to setup the call. In that instance, the incoming call processing system 302 contacts the push notification system 308 and asks that an incoming call push notification be sent to the mobile telephony device 136. The push notification system 308 causes a push notification to be sent to the mobile telephony device with a suitable message. The message included in the push notification can include the identity of the calling party, as reflected in caller ID information that was received as part of the incoming call setup request. This could include the telephone number of the calling party, and a name associated with the calling party.

In addition, the IP telephony system 120 may maintain a list of contacts for the user of the mobile telephony device 136 in a contact system 306 of the IP telephony system 120. If that is the case, the IP telephony system 120 checks the contact system 306 to see if there is an entry in the user's contact list corresponding to the calling party. If so, the calling party's identity, as reflected in the user's contact list entry, will be inserted into the push notification message in place of the telephone number or name provided as part of the caller ID information in the call setup request.

The push notification system 308 sends the push notification directly to the mobile telephony device 136, or the internal push notification system 308 of the IP telephony system 120 causes the external push notification system 320 to send the push notification to the mobile telephony device 136.

The mobile telephony device 136 receives the push notification and causes a message to be displayed to the user. The mobile telephony device 136 may also cause an alert tone to be played to alert the user to the receipt of the push notification. As explained, the push notification can include a message such as "Incoming call from party X, would you like to answer the call?" Two selectable buttons are displayed, one to decline the call, and the other to accept the call.

If the user selects the accept call button, the mobile telephony device 136 launches the application used to communicate with the IP telephony system 120, and the application registers with the IP telephony system 120. The call is then setup between the IP telephony system 120 and the mobile telephony device 136 via data packets that traverse the data network 110 or a data channel provided by the cellular service provider 130.

A similar process occurs if an incoming message processing unit 304 of the IP telephony system 120 receives an incoming communication directed to the mobile telephony device 136, and the IP telephony system 120 cannot communicate with the application on the mobile telephony device 136. The communication could be a SMS or MMS text message, a video message, a voicemail message or some other type of deliverable communication. In this instance, the incoming message processing unit 304 requests that the internal push notification system 308 send a push notification to the mobile telephony device 136.

Here again, the push notification would include suitable text, such as "An incoming SMS message has been received from Party X, would you like to view the message?" When the mobile telephony device 136 receives the push notification, it displays the message along with two selectable buttons that the user can select to either ignore the message, or cause the message to be displayed. Here again, the identity of the party that sent the message that appears in the displayed text may be drawn from the user's contact list maintained in the contact system 306 of the IP telephony system 120. This information would be obtained using the caller ID or sending party identity information appearing in the received communication. If the user selects the button that causes the communication to be displayed, the application is loaded and run on the mobile telephony device 136, the application registers with the IP telephony system 120, and the application retrieves the communication from the incoming message processing unit 304 of the IP telephony system and displays or plays it for the user.

In some instances, when the IP telephony system 120 receives an incoming call or an incoming communication that is directed to the mobile telephony device 136, the IP telephony system 120 will not only be unable to immediately connect the call or deliver the communication, but the IP telephony system 120 may also fail in delivering a push notification to the mobile telephony device 136. This could occur if the mobile telephony device 136 is turned off, or if the mobile telephony device is out of range of a wireless access point 140 and/or the cellular service provider 130. Under these circumstances, the user will not only miss the call or communication, but the user will also not be aware of the fact that the call or communication was missed. In fact, under these circumstances, the user may miss and be unaware of multiple incoming calls and communications.

To keep the user fully informed, systems and methods embodying the invention provide information about missed calls and unread/unplayed communications the next time that the IP telephony system 120 is able to establish communications with the mobile telephony device 136. The delivery of this information to the mobile telephony device 136 could occur in a variety of different ways, and the information could be presented to the user in a variety of different ways.

For example, the next time that the user loads and runs the application on the mobile telephony device 136, the application registers with an application registration unit 314 of the IP telephony system 120. During the registration process, the application registration unit checks with the incoming call processing system 302 and the incoming message processing unit 304 of the IP telephony system 120 to determine if there are missed calls and/or undelivered messages that the user has not yet been made aware of. If that is the case, this information is provided to the application on the mobile telephony device 136. The application, in turn, presents this information to the user.

In some embodiments, a display interface generated by the application on the mobile telephony device 136 displays information about any missed calls and any unread/unplayed communications. This could include an indication of the identity of the calling party for missed calls, and the identity of the party that sent any unread communications.

A display screen of the mobile telephony device 136 may show a badge or icon that is selected by the user to load and run the application used to communicate with the IP telephony system 120. In such embodiments, numbers may appear on or adjacent the badge or icon to indicate to the user that there are missed calls and unread/unplayed communications. This might be a single number that represents all missed call events and all unread/unplayed communications. In alternate embodiments, two or more numbers may be displayed on or adjacent a badge or icon, where each number corresponds to a different category. For example, one number may indicate the number of missed calls, whereas a second number may indicate the total number of unread/unplayed communications that have been received for the user.

Information about missed calls and unread or unplayed messages could also be delivered to the mobile telephony device 136 as part of a push notification. For example, if the mobile telephony device 136 is not running the application, and the mobile telephony device was out of range of a wireless access point 140 and the cellular service provider 130 for an extended period of time, several missed calls and several incoming communications may have been received by the IP telephony system 120 for the user. When the user comes back within range of a wireless access point 140 or the cellular service provider 130, the application will still not be running on the mobile telephony device 136. However, if the IP telephony system 120 sends a push notification to the mobile telephony device 136, the push notification can include information about the total number of missed calls and the total number of unread/unplayed communications that have been received by the IP telephony system 120 while the user was out of communications range. For example, if the IP telephony system 120 receives a new call for the user, the push notification system 308 causes a push notification to be sent to the mobile telephony device 136 to see if the user wishes to answer the call.

Even if the user declines to answer the call, the push notification received by the mobile telephony device 136 includes information about the total number of calls that were missed by the user and the total number of unread/unplayed communications that are waiting for the user. And once this information is received, the mobile telephony device 136 uses the information to update the numbers appearing on or adjacent a badge or icon connected with the application. Thus, even where the push notification does not result in the application being loaded and run, the numbers appears on the badge or icon will alert the user to the fact that he missed some calls and that there are unread/unplayed communications waiting to be reviewed. Based on this information, the user may choose to load and run the application so that the user can access information about the missed calls, or so the user can review the unread/unplayed communications.

The incoming message processing unit 304 of the IP telephony system 120 receives incoming communications directed to the user's mobile telephony device 136. If the incoming message processing unit 304 cannot immediately deliver the communication to the mobile telephony device 136, either via an immediate communication with the application on the mobile telephony device 136 or by sending a push notification to cause the running of the application, the incoming message processing unit 304 stores the communication for later delivery. The incoming message processing unit 304 maintains a queue of unread/unplayed communications for later delivery.

In some embodiment, the incoming call processing system 302 generates and maintains a similar list of missed calls for each user's mobile telephony device 136. However, in alternate embodiments, an event processing system 310 of the IP telephony system 120 is used to generate the list of missed calls. An event processing system 310 reviews the call detail records (CDRs) that are created by the IP telephony system 120 each time that a call is handled by the IP telephony system 120. The CDR data is stored in a CDR database 312 that is accessed by the event processing system 310. The event processing system 310 reviews the information in the CDRs to determine when an incoming call directed to the mobile telephony device 136 is missed for any reason. Particular types of information present in the CDRs will allow the event processor 310 to determine when an incoming call was missed by the user, and when the user is unaware that the call was even missed, as described above.

The event processing system 310 may periodically review the information contained in the CDR database 312 to create lists of missed calls for each mobile telephony device 136. Alternatively, the event processing system 310 may add missed calls to lists being maintained for each mobile telephony device 136 as those calls are missed.

Information about missed calls that is developed by either the incoming call processing system 302 or the event processing system 310 is provided to the application registration unit 314 so that the information can be provided to an application on a mobile telephony device 136 each time that the application registers with the IP telephony system 120. This same information is also provided to the push notification system 308 so that the information can be included in a push notification each time that a push notification is sent to the mobile telephony device.

Likewise, information about unread/unplayed communications received by the incoming message processing unit 304 is provided to both the application registration unit 314 and the push notification system 308 so that this information can be delivered to the application on the mobile device 136 when it registers with the IP telephony system, and so that the information can be provided in push notifications sent to the mobile telephony device 136.

A push notification may also be sent to the mobile telephony device 136 when a new contact is added to the user's contact list maintained by the contact system 306 of the IP telephony system 120. This could occur when the contact system 306 is unable to directly communicate with the application on the mobile telephony device 136.

Information about new contacts that have been added to a user's contact list on the contact system 306 may be provided to the application on the mobile telephony device 136 by the application registration unit 314 when the application registers with the IP telephony system 120. Also, information about a number of new contacts that have been added to the user's contact list on the contact system 306 may also be included in a push notification sent to the mobile telephony device 136. Here again, this information could be presented as numbers on or adjacent a badge or icon related to the application so that the user is informed that some new information is available.

Also, information about unheard voicemail messages, and/or a total number of stored voicemail messages may be provided to the application on the mobile telephony device 136 by the application registration unit 314 when the application registers with the IP telephony system 120. Also, information about voicemail messages may also be included in a push notification sent to the mobile telephony device 136. Here again, this information could be presented as numbers on or adjacent a badge or icon related to the application so that the user is informed that some new information is available.

Figure 4:
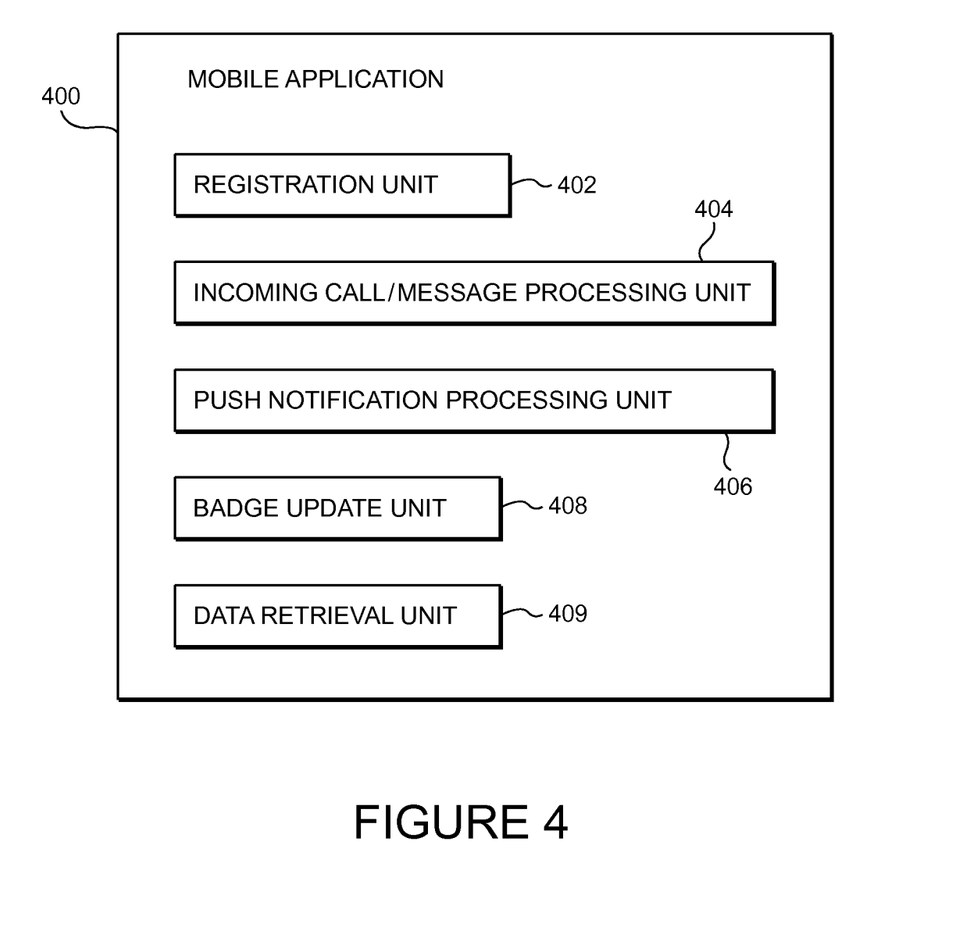
FIG. 4 is a block diagram showing elements of an application embodying the invention that may be loaded and run by a mobile telephony device.

FIG. 4 illustrates some functional elements that are present in the mobile application 400 loaded onto and run by a mobile telephony device 136. The mobile application 400 includes a registration unit 402 that is responsible for registering with the IP telephony system 120 when the application is able to establish a wireless data connection with the IP telephony system 120.

An incoming call/message processing unit 404 is responsible for setting up calls through the IP telephony system 120. This unit also sends outgoing communications such as SMS, MMS and video messages to the IP telephony system 120, and receives similar communications from the IP telephony system 120. Such actions would occur when the application is loaded and running on the mobile telephony device 136, and a wireless data connection has been established with the IP telephony system 120.

A push notification message processing unit 406 may interact with other elements of the mobile telephony device 136, and/or with the operating system of the mobile telephony device 136 to receive and process information that was delivered via a push notification. Such information may be used by a badge update unit 408 to update numbers indicative of various items of information that appear on a badge or icon associated with the application. In alternate embodiments, the updating of numbers on a badge or icon associated with the application may be performed by other elements of the mobile telephony device 136, or by the operating system of the mobile telephony device 136, using information in a received push notification.

A data retrieval unit 409 retrieves information from the IP telephony system 120. This could include information about missed calls, information about unread/unplayed communications, or the unread/unplayed communications themselves.

Figure 5:
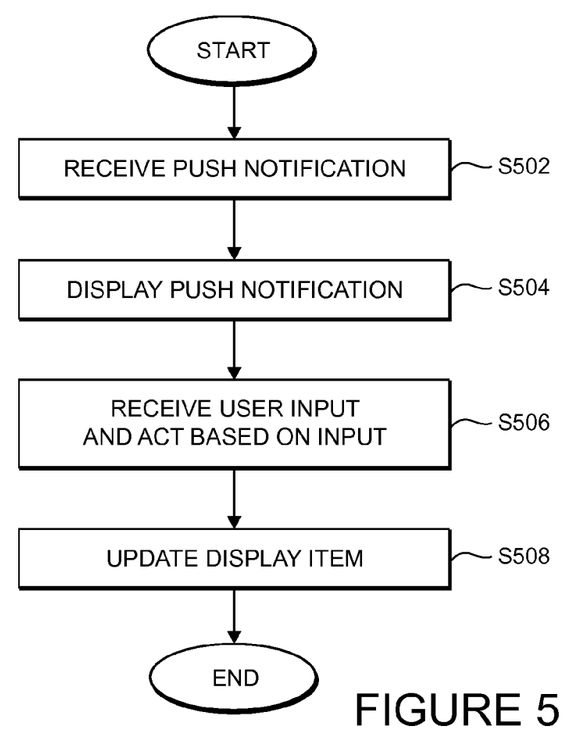
FIG. 5 is a flowchart of a method embodying the invention that is performed by a mobile telephony device.

FIG. 5 illustrates steps of a method embodying the invention that would be performed by a mobile telephony device 136 when a push notification is received. The method begins in step S502, when a push notification is received by the mobile telephony device 136. In step S504, a message that is part of the push notification is displayed to the user. As explained above, this could include displaying two user selectable buttons that allow the user to ignore the message, or cause a particular action to occur.

In step S506, the mobile telephony device accepts some form on input provided by the user. This would typically include the user selecting one or the other of the displayed buttons. If the user wishes to accept an incoming call or review an incoming message that is announced by the push notification, the application would be loaded and run, and the call would be connected or the incoming communication would be displayed/played. Alternatively, if the user wishes to ignore the incoming call or communication, the user selects the other displayed button.

In step S508, a display item is updated. This could include updating a number appearing on or adjacent to a badge or icon associated with the application. As explained above, even where the user chooses to ignore an incoming call or communication that is announced by a received push notification, information contained in the push notification could be used in step S508 to update a display item associated with the application. Thus, for instance, a number of missed calls indicated by a number on a badge or icon could be updated in step S508 using information contained in the push notification. Also, a number indicating the number of unread/unplayed communications that have been received for the user could be updated in step S508 using information in the received push notification.

Figure 6:
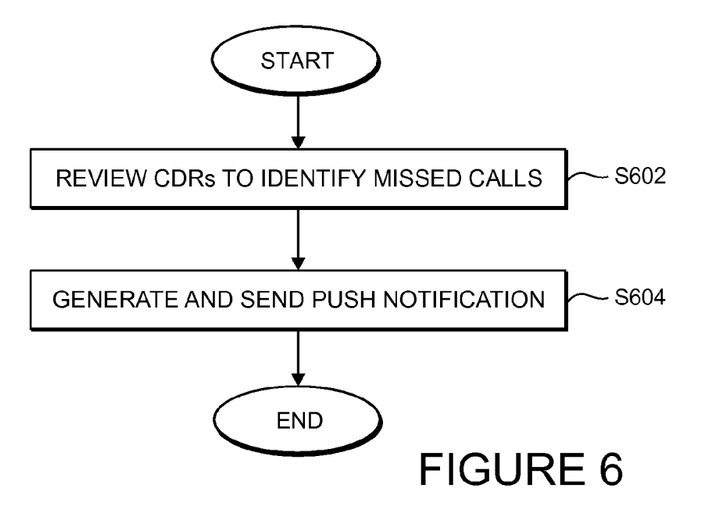
FIG. 6 is a flowchart of a method embodying the invention that is performed by elements of an IP telephony system.

FIG. 6 illustrates steps of a method that would be performed by in IP telephony system to determine the number of missed calls that have occurred for a mobile telephony device 136, and to provide that information to the mobile telephony device 136 in a push notification. The method begins in step S602, when an event processing system 310 of an IP telephony system 120 reviews information contained in a CDR database 312 to identify the number of missed calls that have been received for a particular mobile telephony device 136. Then, in step S604 the push notification system of the IP telephony system 120 sends a push notification to the mobile telephony device with information about the number of missed calls. This allows the mobile telephony device to present this information to the user of the mobile telephony device 136 via a method as described above in connection with FIG. 5.

In some embodiments of the invention, the application on a user's mobile telephony device may allow the user to mark a contact list to identify people on the contact list that should be notified whenever the user's mobile telephony device registers with the IP telephony system and becomes available via a data network. Thereafter, when the user's mobile telephony device registers with the IP telephony system, the IP telephony system sends notifications to the parties who were identified on the user's contact list to inform them that the user is available for calls or other communications via a data network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for updating a display on a mobile telephony device that receives telephony service from a first telephony system to indicate that unread information at a second telephony system is available, the method comprising:
   receiving a push notification that is caused to be delivered to the mobile telephony device by the second telephony system, the push notification including information indicative of at least one of a number of unseen missed calls, a number of unread messages, or a number of new contacts available for the user of the mobile telephony device at the second telephony system; and
   updating a display item on the mobile telephony device to reflect the information included in the push notification.

2. The method of claim 1, wherein the updating step comprises updating the display item to indicate a number of unseen missed calls that have been received by the second telephony system for the user of the mobile telephony device.

3. The method of claim 1, wherein the updating step comprises updating the display item to indicate a number of unread messages that have been received by the second telephony system for the user of the mobile telephony device and which have not yet been displayed to or played to the user.

4. The method of claim 1, wherein the updating step comprises updating at least one number that appears on a badge displayed on the mobile telephony device.

5. The method of claim 1, wherein the receiving and updating steps are performed by an application running on the user's mobile telephony device.

6. The method of claim 1, wherein the push notification announces an incoming call, wherein the method further includes causing a message to be displayed on a display screen of the mobile telephony device, and wherein the message includes user selectable buttons that the user can activate to either receive the call or decline the call.

7. The method of claim 6, wherein the push notification is received from the second telephony system, wherein the step of causing the message to be displayed includes causing a message to be displayed that includes an identity of the calling party, and wherein the displayed identity information is taken from an address book maintained for the user by the second telephony system.

8. The method of claim 1, wherein the push notification is delivered using a communication path utilized by the first telephony system.

9. The method of claim 1, wherein the push notification is delivered using a communication path that includes a cellular service provider utilized by the first telephony system.

10. The method of claim 1, wherein the push notification is delivered using a communication path that includes a data network utilized by the first telephony system.

11. The method of claim 1, wherein the push notification is sent using a push notification service of the second telephony system.

12. The method of claim 1, wherein the push notification is sent using a push notification service external to the second telephony system.

13. A method of sending information regarding missed calls to a mobile telephony device that receives telephony service from a first telephony system, wherein the missed calls were received by a second telephony system, the method comprising:
   reviewing call data records (CDRs) maintained by the second telephony system to identify missed calls that were directed to a user's mobile telephony device; and
   sending a push notification to the user's mobile telephony device using a push notification service that is caused to send the push notification by the second telephony system, where the push notification includes information about a total number of unseen missed calls that were directed to the user's mobile telephony device.

14. The method of claim 13, further comprising determining a total number of unread messages that have been received by the second telephony system for the user's mobile telephony device but which have not yet been delivered to the user's mobile telephony device, and wherein the sending step further comprises causing a push notification to be sent that includes information about the total number of unread messages.

15. The method of claim 13, further comprising determining a total number of unread messages that have been received by the second telephony system for the user's mobile telephony device but which have not yet been displayed to or played to the user over the mobile telephony device, and wherein the sending step further comprises causing a push notification to be sent that includes information about the total number of undisplayed or unplayed messages.

16. The method of claim 13, further comprising determining a total number of new contacts that have been added to an address book that is maintained by the second telephony system for the user and which have not yet been delivered to the user's mobile telephony device, and wherein the sending step further comprises causing a push notification to be sent that includes information about the total number of new contacts that have not yet been delivered to the user's mobile telephony device.

17. The method of claim 13, wherein the sending step comprises causing a push notification announcing an incoming call to be sent.

18. The method of claim 17, further comprising obtaining information about the identity of the calling party who placed the incoming call from an address book maintained for the user by the second telephony system using caller ID information associated with the incoming call, and wherein the push notification includes the obtained identity information.

19. The method of claim 13, wherein the sending step comprises causing a push notification announcing a received message to be sent.

20. The method of claim 19, further comprising obtaining information about the identity of the party who sent the received message from an address book maintained for the user by the second telephony system using sending ID information associated with the incoming message, and wherein the push notification includes the obtained identity information.

* * * * *